June 16, 1942.    E. W. SCHULENBERG    2,286,511
TUBE NOSING MACHINE
Filed Dec. 6, 1940    2 Sheets-Sheet 1

INVENTOR
Edgar W. Schulenberg
BY
S. C. Yeaton
ATTORNEY

June 16, 1942.　　E. W. SCHULENBERG　　2,286,511
TUBE NOSING MACHINE
Filed Dec. 6, 1940　　2 Sheets-Sheet 2

INVENTOR
Edgar W. Schulenberg
BY
S. C. Yeaton
ATTORNEY

Patented June 16, 1942

2,286,511

UNITED STATES PATENT OFFICE 2,286,511

TUBE NOSING MACHINE

Edgar W. Schulenberg, Dunkirk, N. Y., assignor to American Locomotive Company, New York, N. Y., a corporation of New York Application December 6, 1940, Serial No. 368,788

1 Claim. (Cl. 80—12)

This invention relates to a tube nosing machine and principally to a machine for nosing heated ends of tubes to form shells appropriate for use, for example, in the manufacture of demolition bombs.

The invention is concerned more particularly with a roll-provided device, for rolling a nose on a tube, adapted for use with specially designed or standard machines, as for example lathes, vertical boring mills, or a machine commonly known as a Van Stone machine, such standard machines requiring no, or at least very slight modifications to adapt them for the device, the essential features being rotative relative movement between the tube and device and longitudinal or axial relative movement between the tube and device whereby they are rotated relative to each other and moved toward each other during a nose-forming operation.

The principal object of the machine is to nose a heated end of a tube by one nose-forming operation or a succession of operations, each successive operation being preceded by reheating the partially nosed end, the nose-forming being accomplished by rolls mounted in the machine or in the device for no movement of the rolls relative to their mountings except that of rotation about their respective axes, and having nose-forming faces concave in an axial direction, whereby a nose will be formed convex in axial direction and the exact counterpart of the concave roll face, and whereby the wall of the tube portion forming the nose will gradually increase in thickness from the larger end of the nose to the smaller or tip end and the tip end will be open or closed as desired depending upon the arrangement of the nose-forming rolls, means being preferably provided for facing the tip end of the nose.

Other and further objects of and advantages achieved by the present invention will be apparent from the following description of an improved embodiment thereof.

Figure 1:
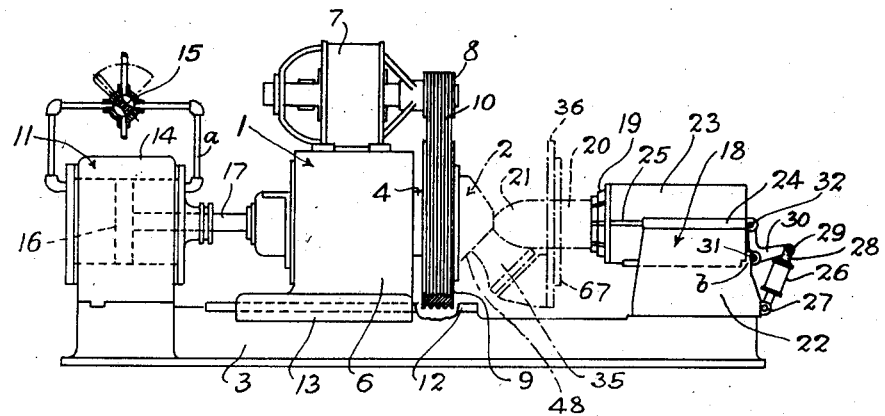
Figure 3:
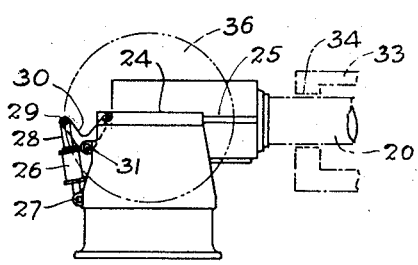
Figure 2:
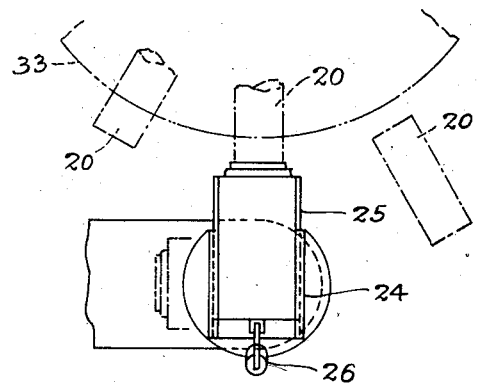
Figure 4:
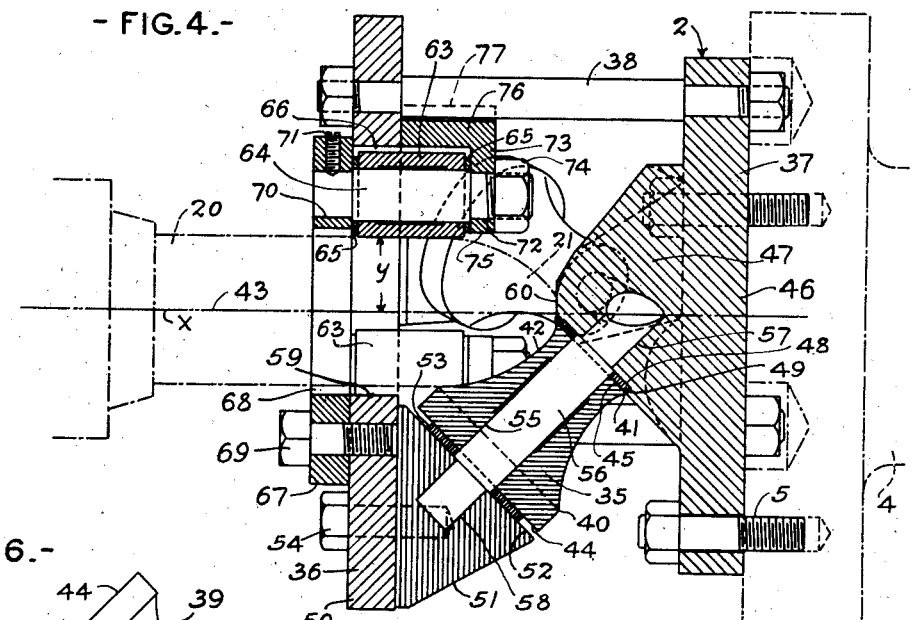
Figure 6:
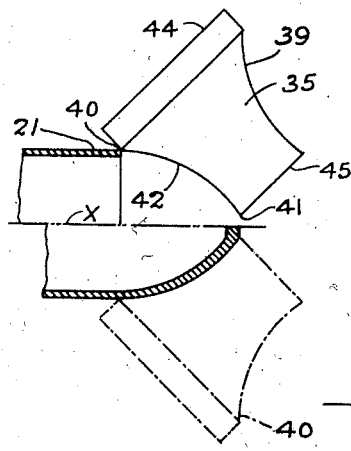
Figure 7:
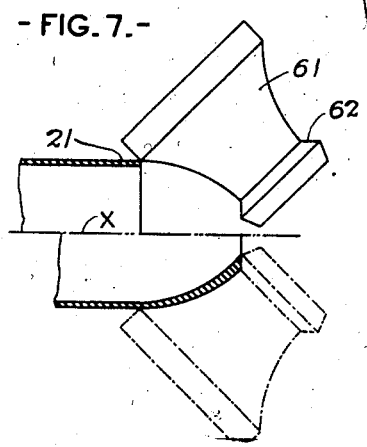
Figure 5:
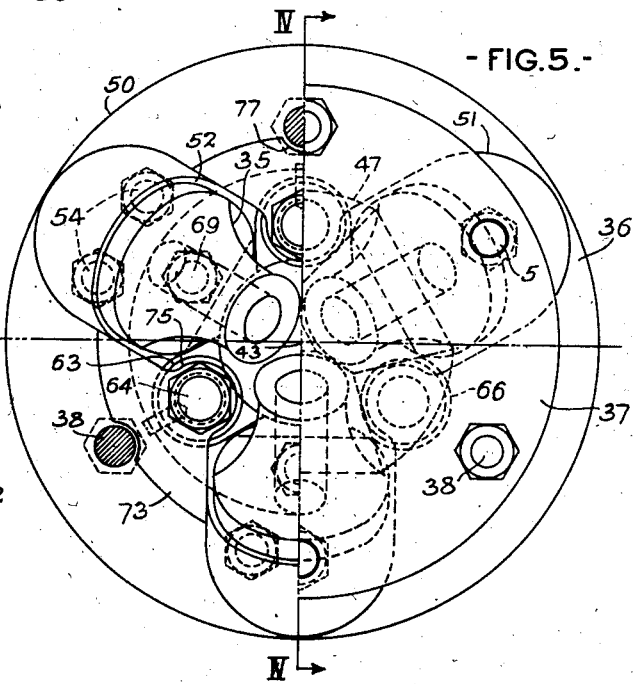

Referring to the drawings showing an exemplification of the invention, Figure 1 is a diagrammatic side elevation, partly in section and partly broken away, of a machine embodying the invention, a part of a roll-provided device being indicated in dot and dash lines and a tube fully nosed being indicated also in dot and dash lines; Fig. 2 is a diagrammatic plan view of a part of the machine showing a tube support, and in dot and dash lines a furnace, tubes and the support in a second position, two of the tubes being indicated broken; Fig. 3 is a diagrammatic end view of the machine viewed from the right of Fig. 1, the device being indicated in dot and dash lines and the tube support being directed as in Fig. 2, a fraction of the furnace being indicated also in dot and dash lines and a broken supported tube extending into the furnace being indicated also in dot and dash lines; Fig. 4 is an enlarged section of the device taken on the line IV—IV of Fig. 5, parts being shown in full, a portion of the machine to which the device is secured being indicated in dot and dash lines, and a nosed tube and a fragment of its support being indicated also in dot and dash lines; Fig. 5, at the right, is a half end view of the device looking from the right of Fig. 4, and at the left, a similar view with one of the roll supports removed and other parts omitted and the tie bolts shown in section; Fig. 6 is a diagrammatic view indicating, at the upper half, a piece of a tube, shown in section, at the beginning of the nose-forming operation, with the tube initially engaging the roll, and at the lower half a completely nosed end of a piece of a tube, shown in section, a roll being indicated in dot and dash lines showing the relative positions of the tube and roll at the end of a nose-forming operation; and Fig. 7 is a view similar to Fig. 6, showing a roll of slightly different design.

The rolling feature of the invention may, as aforesaid, be used in conjunction with a specially designed machine or with one of several standard types. In the present instance, for illustrative purposes, the rolling feature is employed in conjunction with a horizontal machine, indicated generally by the reference numeral 1, (Fig. 1), and the rolling feature is devised as a separate device, indicated generally by the reference numeral 2.

No claim is made for the machine per se, and therefore it is shown diagrammatically and a brief description thereof will suffice.

The machine comprises a bed 3, a spindle 4, to which the device 2 is secured as by studs 5 (Fig. 4), a housing 6 in which the spindle is mounted for rotation, the spindle and device when mounted, having a common axis, and an electric motor 7 for rotating the spindle, mounted on the top of the housing, the motor being provided with a driving pulley 8 and the spindle with a driven pulley 9. The pulleys may be connected by any well-known drive. In the present instance a plurality of belts 10, V-shape in cross section, are employed, and each pulley is provided with a V-shape groove for each of the belts, the belts being broken away and a portion of the pulley 9 being in section in Fig. 1 to show the grooves formed therein, the grooves in pulley 8 being similar thereto. Four belts are shown but in practice any number of belts may be employed, ten being found advantageous. The machine further comprises power means, indicated generally by the reference numeral 11, for moving the housing with its associated parts back and forth in an axial direction during the operation of the machine.

The housing 6 is slidably secured to the bed 3 for the aforementioned back and forth longitudinal or axial movements, by guides 12 formed on each side of the bed and engaging guideways 13 formed on each side of the housing. The power means 11 is fixedly secured to the bed 3 and comprises a power cylinder 14 having ports (not shown) at each end for passage of power fluid to and from the cylinder, the ports being controlled by a valve 15 connected thereto by piping a, as shown, a piston 16 operated by the power fluid in the usual manner, and a piston rod 17 connected at one end to the piston and at its opposite end to the housing 6. The fluid, such as gas or liquid, entering and leaving the cylinder is controlled by the valve so that the housing 6 with its device 2 may be moved longitudinally as desired while the device is rotating, the fluid thereby flexibly forcing the device in the desired controlled manner into nose-forming engagement with the tube as will later be described.

The machine further comprises a tube support, indicated generally by the reference numeral 18. The device 2 is disposed at the end of the housing 6 remote from the piston rod 17 and the support 18 is mounted on the bed 3 at this end of the housing.

The support 18 comprises a chuck 19 for holding the tube, indicated at 20, at the end portion thereof opposite the heated end portion, the chuck operating in the usual manner for engaging the tube therewith and for removing it therefrom. The operation may be controlled either pneumatically or hydraulically in any well-known manner, not shown, as manual control would ordinarily be too slow. The tube is held in a horizontal position with its heated end portion 21 (portion to be nosed) directed toward the device 2 the axis $x$ of the tube as well as the axis of the chuck during the nose-forming operation being in line with the common axis of the device 2 and spindle 4.

While the tube support, as thus far described, involves all the essentials of a support, nevertheless, as an added feature of the machine, a special type of support is shown comprising a turret-like body 22 carried by the bed 3, and turnable about a vertical axis, fixed relative to the bed, by means of usual construction (not shown), and a housing 23 for the chuck 19 and forming at one end thereof a part of the chuck. The body 22 at opposite sides thereof has upwardly extending portions disposed opposite the adjacent sides of the housing 23. These portions are provided with horizontal guideways 24 and the housing 23 is provided at each side with guides 25 engaging the respective guideways 24 so that the housing 23 may be moved longitudinally of the body 22. A power cylinder 26 is connected at one end by the pivotal connection 27 to the side of the body remote from the chuck. The cylinder 26 is provided with a power piston and ports (neither being shown but of usual construction), the ports being for the passage of fluid to and from the cylinder at either end thereof for control of the piston in a manner similar to that described in connection with the power cylinder 14, and the two cylinders may be controlled from the same station, the cylinder 26 having a suitable valve similar to the valve 15 for this purpose. The piston of the cylinder 26 is provided with a piston rod 28 extending through the opposite end of the cylinder. The piston rod is connected by pivotal connection 29 to one arm of a bell crank lever 30 which is connected by pivotal connection 31 to the end of the body above the connection 27, the other arm of the bell crank lever being connected by pivotal connection 32 to the end of the housing 23 opposite the end thereof that houses the chuck 19.

Figs. 2 and 3 show schematically a furnace 33 in which the ends of the tubes to be nosed are heated. The furnace may be either an electric furnace or one fired by gas or oil as desired, but an oil-fired furnace is preferred. The furnace is provided with openings 34 through which the tubes are inserted and withdrawn from the furnace. A tube secured in the chuck is shown (fragmentally) extending into the furnace. Fig. 2 shows another tube (fragmentally) extending into the furnace and a full tube about to be inserted into the furnace. The furnace is of the revolving type, the tubes being initially charged at one station and discharged at another station, namely at a point opposite the housing 23, the tube at this point having been sufficiently heated at its end to be nosed, that is the end within the furnace. The housing 23 is swung or rotated from its nose-forming position, as shown in Fig. 1, to its position shown in Fig. 2, this being a rotation of approximately 90 degrees. The chuck 19 being then open and in line with the tube, the housing 23 is moved toward the tube by operation of the piston in power cylinder 26 until the chuck embraces the end of the tube extending from the furnace. The chuck is then closed and the housing 23, with the tube secured thereto, retracted until it engages the stop b formed on the body 22. The tube support is then turned back to its nose-forming position as shown in Fig. 1, the stop b determining the position for the tube 20 and also receiving the thrust from the tube during nose-forming operation.

The nose-forming operation then proceeds, the device 2 rotating and moving toward the tube in the manner already described. When the nose has been completed the device 2 is retracted to clear the tube, and the tube is then removed from the chuck, the tube support and tube being first turned for removal to a suitable angular position if desired. The machine is then ready for repeating the operation. Ordinarily a tube will not be nosed by one operation, that is to say by one heating. All that is necessary for successive operations is to retract the device, turn the tube support and move the housing 23 to dispose the tube again within the furnace for a reheating. This would take a relatively small period of time.

The rolling device 2 shown in enlarged detail in Figs. 4 and 5, comprises nose-forming rolls 35, a roll support 36 and another roll support 37. The roll supports are spaced from each other in a longitudinal direction and are rigidly bolted together by shouldered tie bolts 38. In securing this device to the spindle 4 the roll support 37 is availed of, which seats snugly upon the outer face of the spindle 4 and is secured thereto by studs 5, before referred to.

Each roll has a nose-forming rolling face 39 circular in cross section, circumferentially larger at the end 40 adjacent the support 36 than at the opposite end 41, the end adjacent the support 37, (for convenience called the face smaller end), and concave between its face ends in an axial direction, as shown at 42. A series of these rolls is employed, three rolls in the present instance, and the rolls are arranged in spaced relation about the longitudinal center line therebetween which is coincident with the aforementioned common axis shown at 43. The face larger end 40 is disposed at a distance from the center line substantially equal to the radius $y$ of the tube 20, and the face smaller end 41 at a predetermined distance from the center line equal to the radius of the tip end of the nose 21 to be formed. The rolls converge toward each other from the support 36 in a direction toward the support 37. The rolls are preferably similar as shown and accordingly their axes meet at a common point on the center line and are in planes passing through this center line. Each roll has end faces 44 and 45 at right angles to its axis.

The support 37 comprises a plate 46 and a bearing block 47, preferably formed integral with the plate, and having three bearing faces 48, one for each of the roll end faces 45, for taking the end thrusts of the rolls theretoward, a wear plate 49 being interposed between the adjacent faces 45 and 48.

The support 36 comprises a plate 50 and bearing blocks 51, one for each roll, each provided with a bearing face 52 for supporting the roll adjacent thereto at the face 44, a wear plate 53 being interposed between the adjacent faces 44 and 52. While the blocks 51 may be integral with the plate 50 they are preferably, as shown, made separate and secured to the plate by tap bolts 54. Each roll is mounted in the block 47 and its respective block 51. To this end the roll is preferably, as shown, provided with a central bore 55 and is mounted on a shaft or pin 56 which passes through the bore. The shaft has shouldered end portions extending from the opposite ends of the roll into bores 57 and 58 formed respectively in the block 47 and the block 51 adjacent the roll. The shaft permits the roll to freely revolve and takes the radial thrust of the roller during the nose-forming operation.

The plate 50 is provided with an orifice 59 disposed to permit the tube 20 to pass therethrough and therefrom between and in engagement with the rolling faces with the axis $x$ of the tube coincident with the center line.

It wil be seen from the foregoing that the heated end of the unnosed tube first engages the rolls at their face larger ends, as shown in the upper half of Fig. 6. The nose thereupon, by the rolling process, begins to be formed, and as the tube and device move relatively toward each other under the pressure of the fluid in the power cylinder 14, while the device 2 is positively rotated about the common axis 43 and the rolls freely rotate about their respective axes, the nose is formed progressively initially by the rolling face larger ends and subsequently by the concave faces gradually from the rolling face larger ends to the rolling face opposite or smaller ends.

While each device is preferably designed for a single diameter tube, it will nose tubes of slightly varying diameters within a limited range, as is obvious. Furthermore the shape of the nose being dependent upon the curvature of the rolling faces and the angle at which the rolls are set, these features will be predetermined as desired when constructing the device. Other size devices or devices having other shaped rolls or rolls inclined at other angles may be secured to the spindle 4 if desired.

The block 47 is provided at its outer end with a face 60 crossing the center line, or what is the same thing the axis 43, and at right angles thereto. In the final nosing operation the heated nose end will engage this face and the tip end of the nose will be formed through this engagement, the relative rotation of the face 60 and tube and the pressure of the nose against the face 60 produced by the fluid in the cylinder 14, the face 60 in conjunction with rolls welding the heated tip end of the nosed tube into a solid mass. Fig. 6, at the bottom half, shows such a closed nose and one of the rolls (in dot and dash lines) as the rolls would be placed for forming such a nose, that is to say with the rolling face at the smaller end sufficiently near the tube axis $x$ to work a closing of the tip end.

The showing in Fig. 7 is similar to that of Fig. 6 but here the face smaller end is further away from the axis of the tube so that the tube is not closed. While this result can be attained by the roll as shown in Fig. 6 properly set, and the tip end can be faced by the face 60 of the device, nevertheless another way of facing the tip end is here shown, the face 60 not being employed. In Fig. 7 to face the tip end a modified roll 61 is employed similar to the roll 35 except that the roll 61 is provided at the smaller end adjacent the rolling face with an annular flange 62 having its face directed at right angles to the axis of the tube. This face of flange 62, in its rolling action upon the face of the nose tip, rotates bodily about the axis $x$ and at the same time rotates about the axis of its roll.

An important advantage of the present invention, which is the result of the structural characteristics of the device and the manner of operating the machine, is the formation of a nose having a wall gradually increasing in thickness from substantially the tube wall thickness at the nose larger end to the nose tip end, as clearly seen in Figs. 6 and 7.

In the preferred embodiment of the invention the device is provided with tube guiding means shown as a series of rolls 63, three rolls being employed, disposed respectively between adjacent forming rolls 35 and mounted for free rotation each upon a shouldered shaft or pin 64. These rolls 63 have a wear plate 65 at each end thereof. The shafts 64 are parallel to the center line or axis 43. The rolls 63 are spaced at an equal distance from each other and at a distance from the center line or axis 43 substantialy equal to the radius $y$ of the tube 20. They are disposed so that they will guide the tube where it is first engaged by the rolling face larger ends 40, and they guide the tube for some distance before the tube meets the face larger ends. They are preferably disposed as shown in Fig. 4, extending into plate 50 and extending partly into the orifice 59, the plate being provided with recesses 66 at the orifice 59 for each of the rolls 63.

A ring 67, having an orifice 68 in line with the orifice 59, is secured to the outer face of the plate 50 by tap bolts 69. The ring is provided with orifices 70 in which the outer shouldered ends of the shafts 64 are secured by means of set screws 71 with a wear plate 65 interposed between each roll 63 and the ring 67. The opposite shouldered ends of the shafts 64 are secured in orifices 72 in brackets 73 by means of nuts 74. There is a bracket 73 for each of the rolls 63. The bracket is somewhat right angular in shape, one of the legs thereof, as the leg 75, serving as the mounting for the adjacent shouldered end of the shaft 64, a wear plate 65 being interposed between the leg 75 and the roll 63, and the other leg 76 seating on the inner face of the plate 50 with its outer face provided with a groove 77 partly surrounding the tie bolt 38 adjacent thereto.

In the machine exemplifying the invention in the present instance the nose rolling device 2 is rotated and moved toward and away from the chuck 19 holding the tube 20. This presents an embodiment of simple construction. Nevertheless the chuck may be secured if desired to the spindle 4 to rotate and move longitudinally therewith, and the device 2 may be secured to the housing 23 in which latter case of course the housing would not move in the body 22 nor the body turn about its vertical axis. In short, the invention contemplates either the device 2 or chuck 19 or both rotating, and either the device 2 or the chuck 19 or both moved longitudinally.

While there have been hereinbefore described approved embodiments of this invention, it will be understood that many and various changes and modifications in form, arrangement of parts and details of construction thereof may be made without departing from the spirit of the invention and that all such changes and modifications as fall within the scope of the appended claim are contemplated as a part of this invention.

The invention claimed and desired to be secured by Letters Patent is:

A tube-nosing machine comprising a tube support; a roll support having spaced parts; means for rotating one of said supports; means for moving one of said supports towards the other of said supports in the direction of the axis of said rotation; and at least three tube-nosing rolls within said space spaced circumferentially about said axis, and similarly inclined towards said axis in a direction away from said tube support, each of said rolls being mounted in said parts for free rotation about its axis through contact with said tube, said roll axes being fixed with relation to each other, each of said rolls having a tube-engaging face for rolling said nose throughout the entire length of said nose, said face being circular in radial cross section and being of largest radius at its end nearest said tube support, said face extending from its said end of largest radius to the point of smallest radius of said face providing a major portion of said face concave throughout in axial sections and gradually decreasing in radius from said end of largest radius to said point of smallest radius.

EDGAR W. SCHULENBERG.